April 19, 1932.    W. STEINMANN    1,854,604
APPARATUS FOR THE TREATMENT OF FILMS
Filed April 19, 1929
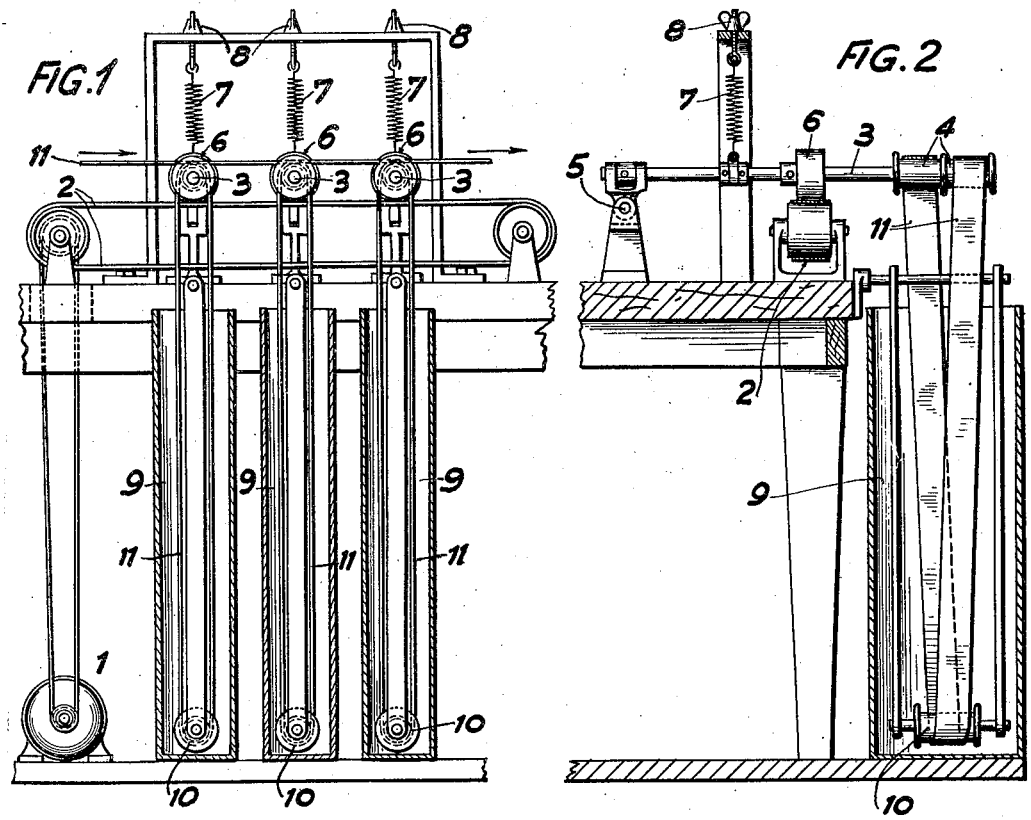
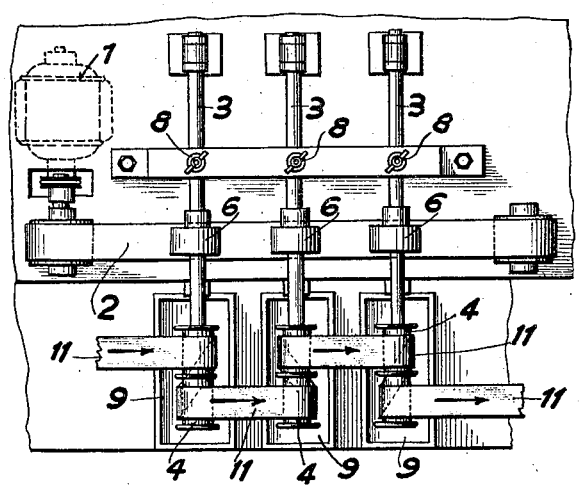
INVENTOR:
Walter Steinmann
By Henry Orth Jr.
Atty.

Patented Apr. 19, 1932

1,854,604

UNITED STATES PATENT OFFICE

WALTER STEINMANN, OF AARAU, SWITZERLAND, ASSIGNOR TO THE FIRM KERN & CIE. A. G., OF AARAU, SWITZERLAND

APPARATUS FOR THE TREATMENT OF FILMS

Application filed April 19, 1929, Serial No. 356,429, and in Switzerland May 9, 1928.

In film treating apparatus, it is known, to treat the films automatically or in semi-automatical manner. These apparatus enable to move the film ribbons continuously or intermittently through various baths for developing, fixing, washing, consolidating, colouring etc. by means of a roller or drum drive.

In the construction of these machines the main difficulty is encountered in eliminating the unequal tensioning to which the films are subjected while passing through the various baths. As these baths contain chemicals and liquids of different character they, necessarily, exert a different influence on the films and variations of length are apt to arise in the ribbons which render a uniform run of the latter through the various baths impossible and very often result in a damaging of the films.

These difficulties are still greater if film ribbons are to be treated which are composed of heterogeneous parts as regards the film material. This is especially the case, when amateur films are to be treated, as a great number of different brands of such films are in the market. The different brands of films, necessarily, have different qualities which, during their treatment in the various baths, result in unequal variations in length. Now, if a plurality of such films are united to a ribbon in order to be subjected to treatment the variations in length of the individual films to be expected are so uncertain that a compensation of the actually arising variations in length, by a before-hand adjustment of the running speed, for instance, by changing the diameter of certain drive rollers or by similar steps is rendered impossible.

The object of the present invention is to provide for an apparatus which permits of treating such film ribbons composed of heterogeneous parts without damaging the same.

The apparatus, according to the invention, comprises a common driving member by which each drive roller is actuated by means of a friction drive and means for influencing the running speed of each drive roller when the film ribbon, subjected to treatment, changes its length, for the purpose of equalizing the tensioning of the film ribbon throughout its entire length.

In the accompanying drawings an embodiment of the invention is illustrated, by way of example only, and it shows:
Fig. 1 a front elevation,
Fig. 2 a side elevation,
Fig. 3 a top plan view of the same.

The drawings show a motor 1 by means of which a drive is imparted to an endless band 2 which serves as a common driving member for all the drive rollers 4. This endless band 2 extends transversely of the driving shafts 3 each of which, on its one end, carries a drive roller 4 and at its other end is pivotally connected at 5 to a stationary point. Each drive roller 4 consists of two equal parts which are separated by a flange. The drive is imparted to the drive rollers 4 by means of frictional engagement when the friction rollers 6, fixed to the driving shafts 3, are pressed against the endless band 2. The driving shafts 3 are each acted upon by a tension spring 7 which tends to withdraw the corresponding friction roller 6 from the endless band 2. The tensioning of the springs is adjustable by means of screws 8 provided with wing nuts.

Each driving shaft is associated with a container 9 which is positioned underneath the pertaining drive roller 4 and within each of these containers 9 a guide roller 10 is arranged adjacent to its bottom. The containers 9 serve for receiving the liquids used for the treatment of the film ribbons, such as developing, fixing, washing, colouring etc.

The film ribbon 11 runs over the one part of each drive roller 4 into the corresponding container 9, thence about the respective guide roller 10 and upwardly, over the second part of the said drive roller 4, thus, forming a number of loops.

Now, if the film ribbon, during its run through the various baths, is elongated in one of the containers the pertaining driving shaft, by action of the cooperating spring 7, is slightly moved upwards, suchwise, that the corresponding friction roller 6 is somewhat withdrawn from the endless band. Consequently, the friction between the roller 6 and the band 2 is reduced and a temporary slippage occurs until the elongation of the film ribbon, having taken place, is equalized due to the conveyance of the film ribbon by means of the other drive rollers. When this is effected the friction roller 6 is again moved towards the band 2 by action of the film ribbon.

The described apparatus serves for equalizing the tensioning throughout the entire film ribbon to be treated.

I claim:

1. An apparatus for the treatment of films, comprising in combination, a plurality of drive rollers each comprising two parts and each part for engaging a loop portion of a ribbon film, a driving shaft for each of the said drive rollers, carrying the roller on one of its ends, means pivotally mounting the opposite end of each shaft, a tension spring for each of the said driving shafts to automatically take up the slack of the individual loops and means for regulating the tensioning of each of the said springs, suchwise, that, upon the elongation of any of the said loop portions, the pertaining driving shaft is moved and its friction drive is interrupted.

2. An apparatus for the treatment of films comprising in combination a plurality of drive rollers each comprising two parts and each part for engaging a loop portion of a ribbon film, a driving shaft for each roller carried thereby and pivoted at its opposite end, a friction roller on each shaft, an endless belt engaged by the friction rollers, a spring for each shaft to urge the rollers from the belt as the film portion forming the respective loops expands, to decrease the friction of the rollers on the belt.

3. An apparatus for the treatment of films comprising in combination a plurality of drive rollers each comprising two parts and each part for engaging a loop portion of a ribbon film, a common friction driving member for said drive rollers individually engageable by said rollers, and tension equalizing means for the film operatively associated with said drive rollers and adapted to individually alter the drive imparted to each drive roller by said driving member in dependency on the tension in the respective loop portions.

In testimony whereof I have signed my name to this specification.

WALTER STEINMANN.